(12) United States Patent
Azulai et al.

(10) Patent No.: US 9,460,554 B2
(45) Date of Patent: Oct. 4, 2016

(54) AERIAL VIDEO ANNOTATION

(71) Applicant: International Business Machines Corporation, Armonk, NY (US)

(72) Inventors: Ophir Azulai, Tivon (IL); Udi Barzelay, Haifa (IL); Mattias Marder, Haifa (IL); Oded Margalit, Ramat Gan (IL); Dror Porat, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 14/020,911

(22) Filed: Sep. 9, 2013

(65) Prior Publication Data

US 2015/0070392 A1   Mar. 12, 2015

(51) Int. Cl.
| G06K 9/00 | (2006.01) |
| G06T 17/05 | (2011.01) |
| G06T 19/00 | (2011.01) |

(52) U.S. Cl.
CPC ............... *G06T 17/05* (2013.01); *G06T 19/00* (2013.01); *G06T 2219/004* (2013.01)

(58) Field of Classification Search
CPC ... G06T 17/05; G06T 19/006; G06T 7/0018; G06T 2207/10032; G06T 2207/30244
See application file for complete search history.

(56) References Cited

U.S. PATENT DOCUMENTS

| 6,512,857 | B1 | 1/2003 | Hsu et al. | |
| 7,949,150 | B2 | 5/2011 | Haering et al. | |
| 8,331,611 | B2 | 12/2012 | Johnson, II et al. | |
| 8,406,513 | B2 | 3/2013 | Chien | |
| 2006/0293853 | A1* | 12/2006 | Chiou et al. | 701/223 |
| 2010/0008565 | A1* | 1/2010 | Chien | 382/154 |
| 2011/0007150 | A1* | 1/2011 | Johnson et al. | 348/135 |
| 2012/0038770 | A1* | 2/2012 | Azulai et al. | 348/144 |
| 2012/0050524 | A1* | 3/2012 | Rinner et al. | 348/117 |
| 2012/0114229 | A1* | 5/2012 | Zhou | 382/164 |
| 2013/0027555 | A1 | 1/2013 | Meadow | |
| 2013/0155109 | A1* | 6/2013 | Schultz et al. | 345/634 |

FOREIGN PATENT DOCUMENTS

IN    2174DEL2009    4/2011

OTHER PUBLICATIONS

Julier et al., "Adaptive Synthetic Vision", 2006, Enhanced and Synthetic Vision Conference, SPIE Defense and Security Symposium, Conference Paper, pp. 1-10.*
Gaeuman et al., "A Map Overlay Error Model Based on Boundary Geometry", 2005, Geographical Analysis 37, pp. 350-369.*
WenZhong et al., "Modeling uncertainty in geographic information and analysis", 2008, Science in China Series E: Technological Sciences, vol. 51, Supp. I, pp. 38-47.*

(Continued)

*Primary Examiner* — Vu Le
*Assistant Examiner* — Guillermo Rivera-Martinez (57) ABSTRACT

A method comprising using at least one hardware processor for: receiving an aerially-captured video and metadata associated with the video; receiving deviation data indicative of an amount of inaccuracy in the metadata; and overlaying, on the video, a geographic annotation descriptive of an object of interest having known geographic coordinates, wherein the geographic annotation is of a size and a shape representative of the amount of inaccuracy.

8 Claims, 10 Drawing Sheets

(56) References Cited

OTHER PUBLICATIONS

Arun et al., "Self Directed Unmanned Aerial Vehicle for Target Geo-Localization System", 2012 International Conference on Computing, Electronics and Electrical Technologies ICCEET, pp. 984-990, 2012.

Min Han et al., Geolocation of Multiple Targets From Airborne Video Without Terrain Data, Journal of Intelligent and Robotic Systems, vol. 62, Issue 1, Apr. 2011, pp. 159-183.

Park et al., "Identification Of Scene Locations From Geo-tagged Images", ACM Transactions on Multimedia Computing, Communications, and Applications (TOMCCAP), vol. 9 Issue 1, Feb. 2013, Article No. 5.

Arun et al., "Self Directed Unmanned Aerial Vehicle For Target Geo-Localization System", 2012 International Conference on Computing, Electronics and Electrical Technologies ICCEET, pp. 934-990, 2012.

Min Han et al. Geolocation of Multiple Tarets Fom Airborne Video Without Terrain Data, Journal of Inteligent and Robotic Systems, vol. 62, Issue 1, Apr. 2011, pp. 159-183.

Rakesh Kumar, "Registration Of Video To Geo-Referenced Imagery", 14th International Conference on Pattern Recognition, vol. 2, 1998, pp. 1393-1400.

Solbrig et al., "Online Annotation of Airborne Surveillance and Reconnaissance Videos", 11th International Conference on Information Fusion, 2008, pp. 1-8.

Sheikh et al., "Geodetic Alignment Of Aerial Video Frames", Computer Vision Laboratory, Computer Science Department, University of Central Florida, 2003.

David Gaemnan et al., "A Map Overlay Error Model Based on Boundary Geometry" National Research Council Associate, U.S. Geological Survey, Columbia Environmental Research Center, Columbia, MO 65201, 26 Jul. 2005.

Simon J. Julier., "Adaptive Synthetic Vision", Conference Paper—Enhanced and Synthetic Vision Conference, SPIE Defense and Security Symposium, 2006.

Shi WenZhong., "Modeling uncertainty in geographic information and anaysis", Science in China Series E: Technological Sciences, Apr. 2008, vol. 51, Supplement 1, pp. 38-47.

* cited by examiner

AERIAL VIDEO ANNOTATION

BACKGROUND

Manned aircraft, unmanned aerial vehicles (UAVs) as well as satellites are often used for aerial surveillance, mapping and/or the like. These platforms usually carry sophisticated photography equipment, used for capturing still photographs and/or video sequences (hereinafter jointly referred to as "imagery") of the earth's surface.

Geo-referencing the captured imagery is an important process, involving the association of each piece of imagery with its real-world geographic location. For example, when the imagery is a video sequence, the geo-referencing may include a determination of the geographic coordinates of the four corners of frames in the video. The utility of the imagery without this association is doubtful, since the geographic location of various objects of interest appearing in the imagery will remain unknown.

The geo-referencing process commonly involves calculations made based upon data received from a navigation component of the platform, such as its GPS (Global Positioning System) component, as well as from its onboard inertial navigation system (INS). These data are often captured simultaneously with the imagery, and are operatively coupled to it in the form of metadata. For example, an aerial video stream may have coupled to it a stream of metadata indicative of the platform's location and INS parameters at the time of capture.

To perform accurate geo-referencing, the calculations are sometimes aided by a digital terrain model (DTM) which indicates the elevation of the earth and optionally of man-made structures. Other data vastly used for the geo-referencing includes orthophotos, which were previously geo-referenced and corrected to account for camera lens distortion.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising using at least one hardware processor for: receiving an aerially-captured video and metadata associated with the video; receiving deviation data indicative of an amount of inaccuracy in the metadata; and overlaying, on the video, a geographic annotation descriptive of an object of interest having known geographic coordinates, wherein the geographic annotation is of a size and a shape representative of the amount of inaccuracy.

There is further provided, in accordance with an embodiment, a method comprising using at least one hardware processor for: receiving an aerially-captured video and metadata associated with the video; receiving deviation data indicative of an amount of inaccuracy in the metadata; and computing, in real time, possible geographic coordinates of a location pointed at in the video; and overlaying, on the video, a geographic annotation descriptive of an object of interest positioned at the location pointed at in the video, wherein the geographic annotation is of a size and a shape representative of the amount of inaccuracy.

There is yet further provided, in accordance with an embodiment, a computer program product for overlaying a geographic annotation on an aerially-captured video, the computer program product comprising a non-transitory computer-readable storage medium having program code embodied therewith, the program code executable by at least one hardware processor to: receive an aerially-captured video and metadata associated with the video; receive deviation data indicative of an amount of inaccuracy in the metadata; and overlay, on the video, a geographic annotation descriptive of an object of interest having known geographic coordinates, wherein the geographic annotation is of a size and shape representative of the amount of inaccuracy.

In some embodiments, the method further comprises receiving, from a database, the geographic coordinates of the object of interest.

In some embodiments, the metadata comprises at least one parameter selected from the group consisting of: longitude, latitude, elevation, pitch, roll, yaw and field-of-view.

In some embodiments, the amount of inaccuracy pertains to at least one parameter of said group.

In some embodiments, the amount of inaccuracy indicated by the deviation data is defined linearly.

In some embodiments, the amount of inaccuracy indicated by the deviation data is defined non-linearly.

In some embodiments, the geographic annotation is a continuous area.

In some embodiments, the method further comprises receiving a digital terrain model (DTM) and enhancing said size and shape representative of the amount of inaccuracy based on the DTM.

In some embodiments, the geographic annotation is a discontinuous area.

In some embodiments, the program code is further executable by said hardware processor to provide, from a database, geographic coordinates of the object of interest.

In some embodiments, the program code is further executable by said hardware processor to provide a user interface configured to enable a user to mark, on the video, a desired location for the object of interest.

In some embodiments, the program code is further executable by said hardware processor to perform said overlay in real time, responsive to the user marking the desired location.

In some embodiments, the program code is further executable by said hardware processor to receive a digital terrain model (DTM) and to enhance said overlaying based on the DTM.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

A method, a system and a computer program product for overlaying one or more geographic annotations on a video captured by an aerial platform (hereinafter an "aerially-captured video") are disclosed herein. The overlaying may include manual and/or automatic superimposition of a geographic annotation, for example of an object of interest whose geographic coordinates are known, on the video. Advantageously, in some embodiments, the overlaying may be performed without the aid of orthophotos, as commonly used in the industry for enhancing annotation accuracy; instead, inaccuracy in a metadata stream accompanying the video is intelligently accounted for, by visualizing the inaccuracy in a convenient, computationally-efficient manner. That is, the inaccuracy is not attempted to be ultimately solved but is rather conveniently visualized for the user.

Inaccuracies in the metadata may be the result of inherent limitations of the equipment used onboard the platform and/or of deviations occurring randomly during the platform's flight. Such inaccuracies may be linear in nature or non-linear. For example, a GPS component carried by the platform may have a resolution of only up to a few meters or dozens of centimeters at best, and any position reading made by it may be inherently inaccurate to a certain degree. As another example, the INS of the platform, which usually indicates its attitude (roll, pitch and yaw) in relation to the ground, may suffer from momentary or even prolonged inaccuracies, due to interference, slow response of measurement instrumentation, and/or inherent inaccuracy of the instrumentation. A further example pertains to parameters of an onboard digital camera which captures the video. The camera's field-of-view, for instance, may suffer from a certain inaccuracy resulting from manufacturing imperfections in the camera's lens assembly and/or from instability of internal components of the camera.

According to some embodiments, the advantageous visualization of metadata inaccuracy may be performed by displaying the annotation as a continuous area having such a size and/or a shape which is representative of the amount of inaccuracy. That is, the size and/or shape of the annotation overlaid on the video indicates to the user the existence and the magnitude of the inaccuracy, so that he or she can instantly and legibly become aware of the inaccuracy.

Once the user is aware of the inaccuracy and its magnitude, further accuracy enhancements, such as by usage of an orthophoto and/or a DTM, may be redundant. However, in some embodiments, it may still be possible to perform such enhancements, for example if the user determines that the magnitude of the visualized inaccuracy is too great to draw any conclusions from it. For instance, a DTM may be used to enhance the accuracy and/or the legibility of the annotation, by providing elevation data pertaining to the visualized annotation; this may be especially useful in cases of oblique aerial photography, in which certain terrain structures may hide other terrain structures from sight. An example may be a tall mountain photographed obliquely by a platform flying slightly higher than the top of the mountain; in this case, the resulting scene captured by the camera will be of the uphill area of the mountain and of some terrain beyond the mountain—while the mountain's downhill area remains hidden. This scenario, if properly detected by usage of a DTM, may enable the creation of an authentic annotation having a discontinuous area, such as the uphill area of the mountain as well as the unhidden terrain beyond the mountain. Generally speaking, such utilization of DTM becomes more advantageous as the line of sight is more horizontal; for photography which is absolutely vertical, in contrast, DTM may not provide any useful data for the visualization.

In an embodiment of the overlaying, referred herein as "coordinates-to-annotation", coordinates of an object of interest may be received from a user and/or from a database of objects of interest. These coordinates, together with the deviation data, may serve as a basis for computing a size and a shape of a geographic annotation to be overlaid on the video.

In an embodiment of the overlaying, referred herein as "mark-to-annotation", initial input as to where to position the annotation on the video is received from a user, such as by hovering above a desired position or otherwise marking the desired position. Then, the user's marking and the deviation data are used to compute possible coordinates of the marked position. After the possible coordinates have been calculated, the method may continue in the following ways: First, as long as the user continues to hover above the desired location, the calculated coordinates may be translated, in real time, to a location on the video, to overlay a geographic annotation based on these coordinates and on the deviation data. Second, when the user ceases to hover and issues a command to annotate a specific location (such as by clicking), the possible coordinates are recorded, for example in a database and/or transferred to a separate system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a hardware processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1A:
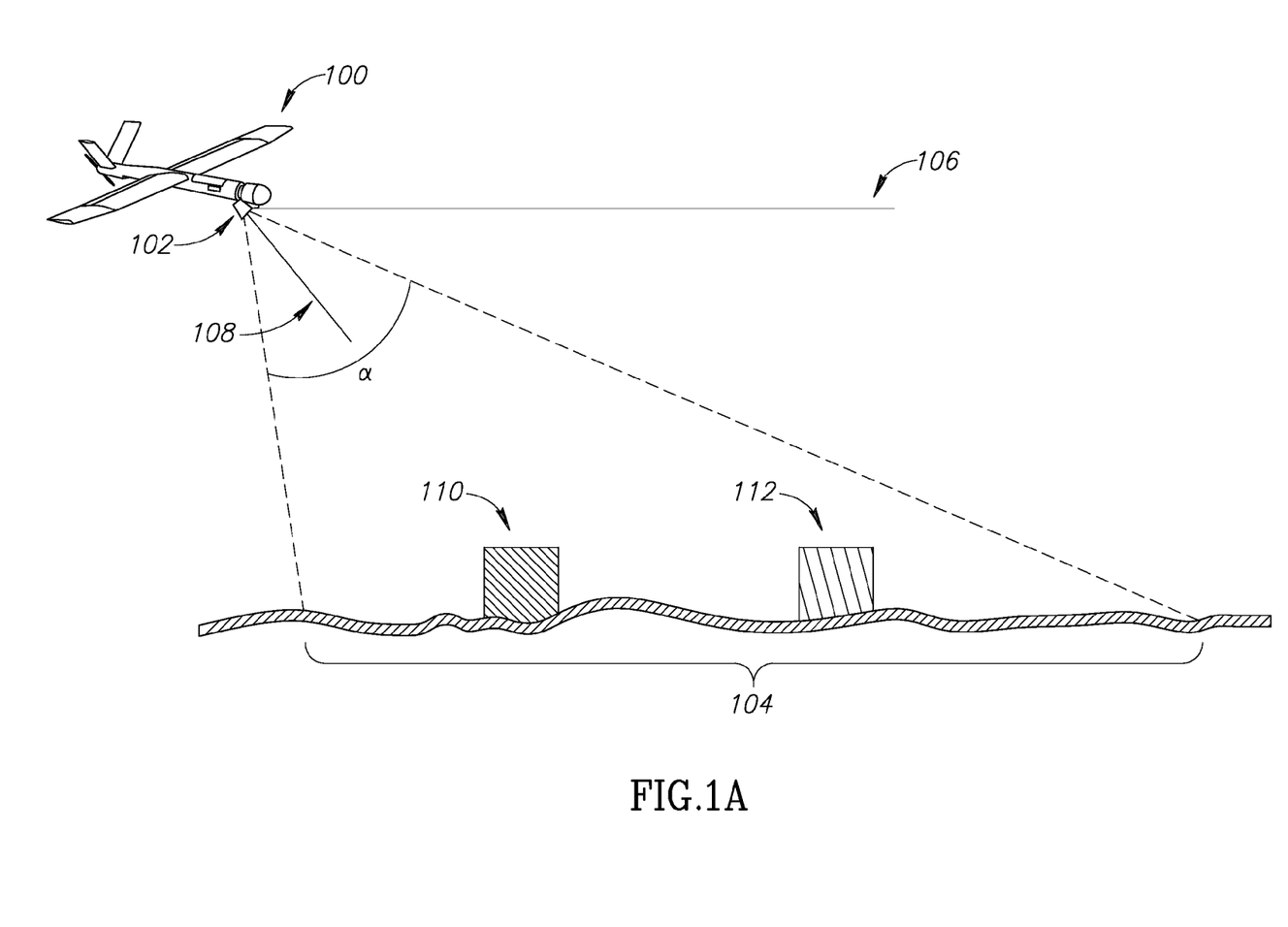
FIG. 1A shows a semi-pictorial view of an aerial platform.

Reference is now made to FIG. 1A, which shows a semi-pictorial view of an aerial platform configured to record still photographs and/or video of the earth's surface. By way of example, the aerial platform is shown herein as a UAV 100, but those of skill in the art will recognize that the present method, system and computer program product may just as well be applied to still photographs and/or video captured by a different platform, such as a satellite, a manned aircraft, or even from a point on a tall structure such as a building or a tower.

UAV 100 may be equipped with a positioning component, such as a GPS module (not shown) or any other type of positioning component configured to provide geographic coordinates (or a "position" for short) of the UAV. For simplicity of discussion, the positioning component is hereinafter referred to simply as "GPS". The term "coordinates", as referred to herein, may refer to a geographic position notation provided in accordance with any suitable geographic coordinate system, such as the traditional longitude-latitude system, the UTM (Universal Transverse Mercator) system, the UPS (Universal Polar Stereographic) system, the MGRS (Military Grid Reference System) and/or the like. Optionally, the term "coordinates" may also include an elevation value which denotes the altitude of UAV 100. The elevation may be provided in accordance with any suitable standard or convention, such as in units of altitude above sea level. The elevation may or may not be adjusted to the actual atmospheric pressure.

UAV 100 may be further equipped with an INS (inertial navigation system; not shown) configured to provide the attitude (roll, pitch and/or yaw) of the UAV in relation to the ground. Additionally or alternatively, UAV 100 may include a different type of instrumentation configured to provide attitude values. For simplicity of discussion, the INS and/or the instrumentation configured to provide attitude values are hereinafter referred to simply as "INS".

UAV 100 may be further equipped with aerial photography equipment, such as one or more digital cameras. In this exemplary embodiment, a single digital camera (hereinafter "camera") 102 is shown. Camera 102 may include one or more image sensors, for example of the CCD (charge coupled device) and/or CMOS (complementary metal oxide semiconductor) type, operatively coupled to a lens assembly, a memory (volatile and/or non-volatile) and/or a hardware processor for orchestrating the operation of the camera. Camera 102 may have an optical field of view α.

Camera 102 may be operatively coupled to the GPS and/or the INS, for receiving a position of UAV 100 and/or an attitude of the UAV from one or both components. The hardware processor of camera 102 may be configured to attach the position and/or the attitude as metadata to a video stream it captures. The attachment may be either in the same digital file as the video and/or in a separate file synchronized and associated with the video. The term "metadata", as referred to herein, relates to digital data which is associated with some basic data, in this case the video, and contains information characterizing and/or associated with the basic data. In present embodiments, accordingly, the metadata may contain position data and/or attitude data of UAV 100. Optionally, the metadata further contains deviation data, which is indicative of the nature and magnitude of one or more inaccuracies of the position and/or the attitude of UAV 100. Alternatively, the deviation data is provided separately from the metadata.

Table 1 shows exemplary metadata associated with a video, for purposes of illustration only:

TABLE 1

| | Metadata Parameters | | | | |
|---|---|---|---|---|---|
| Video frame | Coordinates | Elevation | Pitch | Roll | Yaw |
| 001 | 32.76258, 35.018363 | 400 m | 3° | 0.3° R | 10° L |
| 442 | 32.77258, 35.018363 | 400 m | 0° | 0.0° | 0° |
| 897 | 32.78258, 35.018363 | 400 m | −1° | 5.2° L | 10° R |

As can be seen in the table, the coordinates are gradually changing towards the north along the three frames of the video, namely—the platform is flying northbound. Elevation of the platform is kept steady at 400 m above sea level. The pitch is almost horizontal, ranging between 3° (nose slightly above the horizon) and −1° (nose slightly below the horizon). The roll changes from 0.3° to the right (R) to 5.2° degrees to the left (L), which means that the platform begins with a leveled flight and changes to a left roll. Finally, the yaw changes from 10° to the left (L) to 10° to the right (R), namely—the platform starts with a left slip and transforms to a right slip.

Figure 1B:
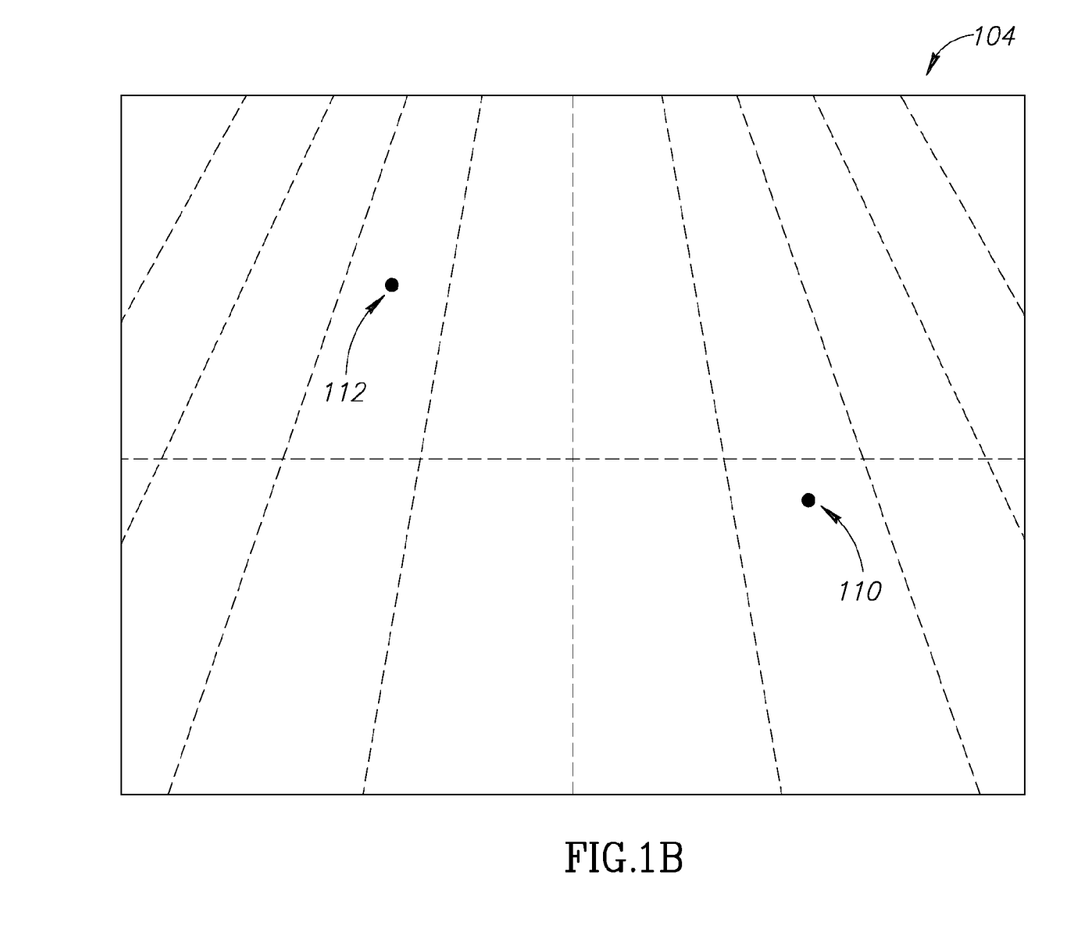
FIG. 1B shows an oblique aerial photograph captured by the aerial platform.

Simultaneous reference is now made to FIGS. 1A and 1B. The surface area captured by camera 102 at a certain point in time is shown as a frame 104. Frame 104 is shown having a rectangular shape (seen from the side in FIG. 1A and in perspective in FIG. 1B). However, such surface area may assume a different shape, as prescribed by certain hardware and/or software properties of camera 102. In this example, frame 104 is an oblique aerial photograph captured at field-of-view (FOV) α of camera 102, the camera having an optical axis 108 which is, essentially, at the center of the FOV. Since optical axis 108 is not perpendicular to the ground, the resulting frame, namely—frame 104, is considered to be an oblique aerial photograph. Still, those of skill in the art will recognize that the present method is also applicable to non-oblique aerial photographs, as well as aerial photographs whose optical axis is angled differently than what is shown in FIG. 1A. In addition, the present method is applicable to cameras in which the FOV is different than what is shown in this figure.

Two objects of interest, a first object 110 and a second object 112, are shown inside frame 104. For simplicity of presentation, objects 110 and 112 are shown as simple cubes in FIG. 1A, and as points in FIGS. 1B, 3, 4 and 5. However, an object of interest may assume any shape and size, and any number of such objects may appear inside a frame such as frame 104. Examples of objects of interest include buildings, trees, vehicles, people, animals, roads, intersections, aquatic bodies, distinguishable terrain shapes and the like.

The video and its metadata may be transmitted to a workstation (not shown) or to any other computerized device or system in which the present method is to be executed. The transmission may be carried out, for example, either (a) during the flight of UAV 100, such as using a wireless communication module of the UAV, (b) after the flight ends, such as by connecting camera 102 to the workstation by wire or wirelessly, and/or (c) after the flight ends, by removing a portable memory device from camera 102 and operatively coupling it to the workstation.

Figure 2A:
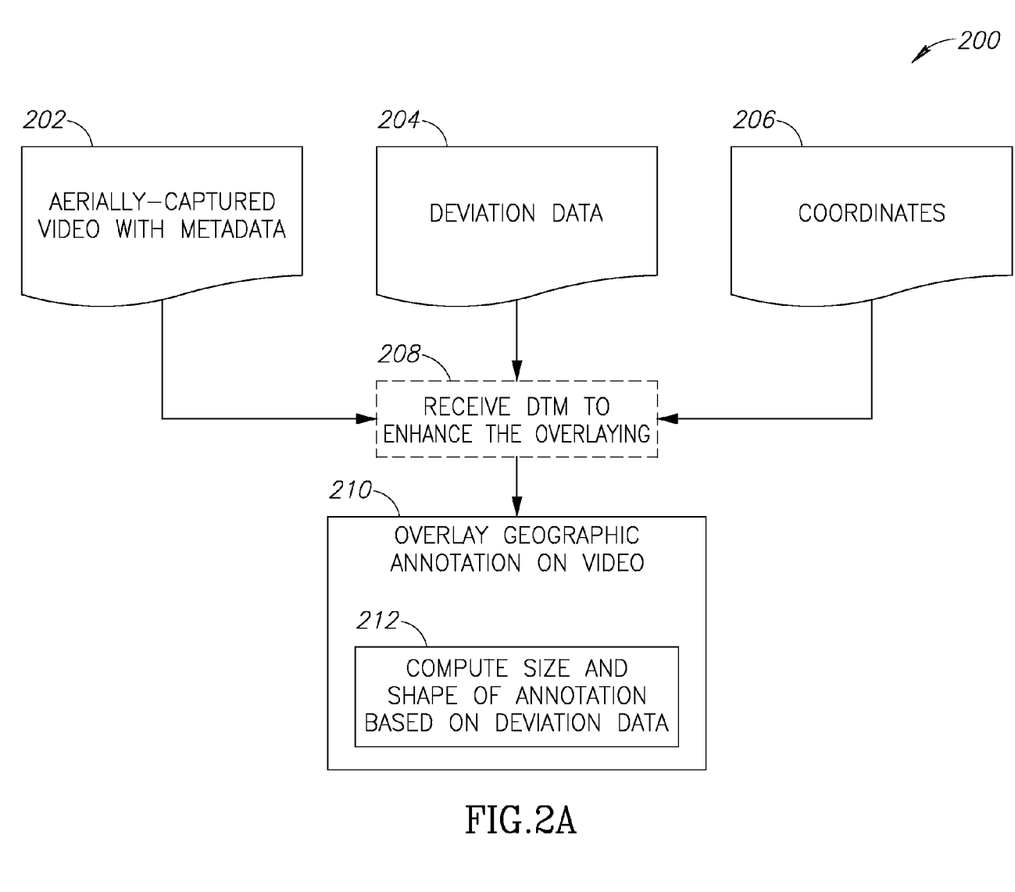
FIG. 2A shows a flowchart of a method for overlaying one or more geographic annotations on an aerially-captured video.

Reference is now made to FIG. 2A, which shows a flowchart of a method 200 for overlaying one or more geographic annotations on an aerially-captured video, in the "coordinates-to-annotation" mode. Method 200 may be executed, for example, by at least one hardware processor.

In a step 202, an aerially-captured video and metadata associated with the video are received, for example by a workstation operable to carry out method 200 or any portion thereof.

In a step 204, deviation data is received. The deviation data may be digital data, indicative of an amount of inaccuracy in the metadata, namely—in at least one parameter of the metadata. For example, the inaccuracy may be in one or more of the following metadata parameters: position (longitude, latitude, elevation), pitch, roll, yaw, camera field-of-view and/or the like. The deviation data may become available by a number of means. As one option, a user may manually enter deviation data. As another example, the deviation data may be based on data provided by a manufacturer of the pertinent equipment; for example, the accuracy of the GPS module may be reported by its manufacturer to be within ±10 meters. As a further example, the deviation data may be automatically created on board UAV 100, for instance by inaccuracies reported by the instrumentation on board on the UAV or otherwise deduced.

In a step 206, geographic coordinates of an object of interest are received. The coordinates may be received from a user who inputs them manually, and or from a database which includes coordinates of multiple objects of interest.

Figure 6:
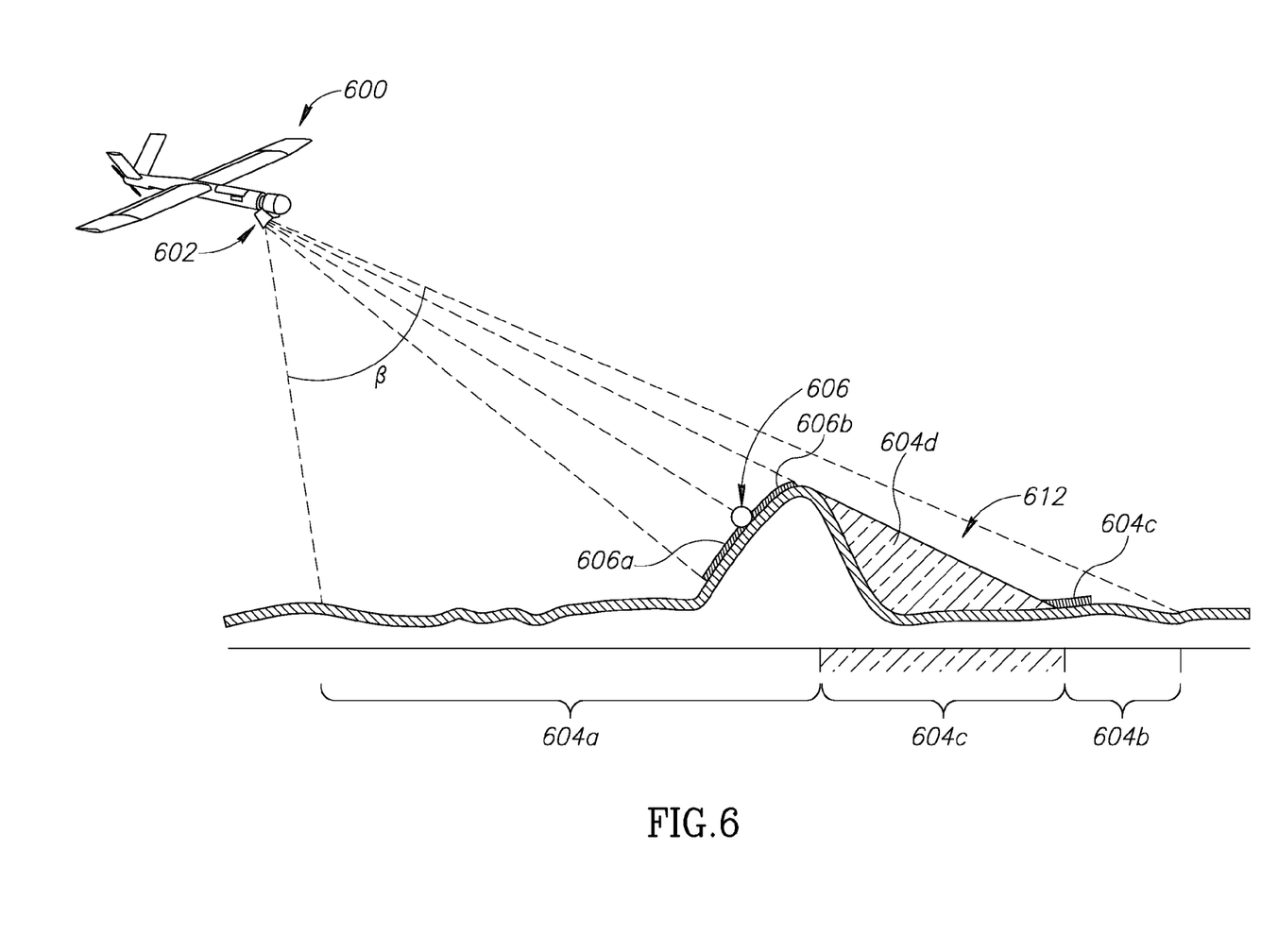
FIG. 6 shows an aerial platform over a terrain partly hidden from a camera of the platform.
Figure 7:
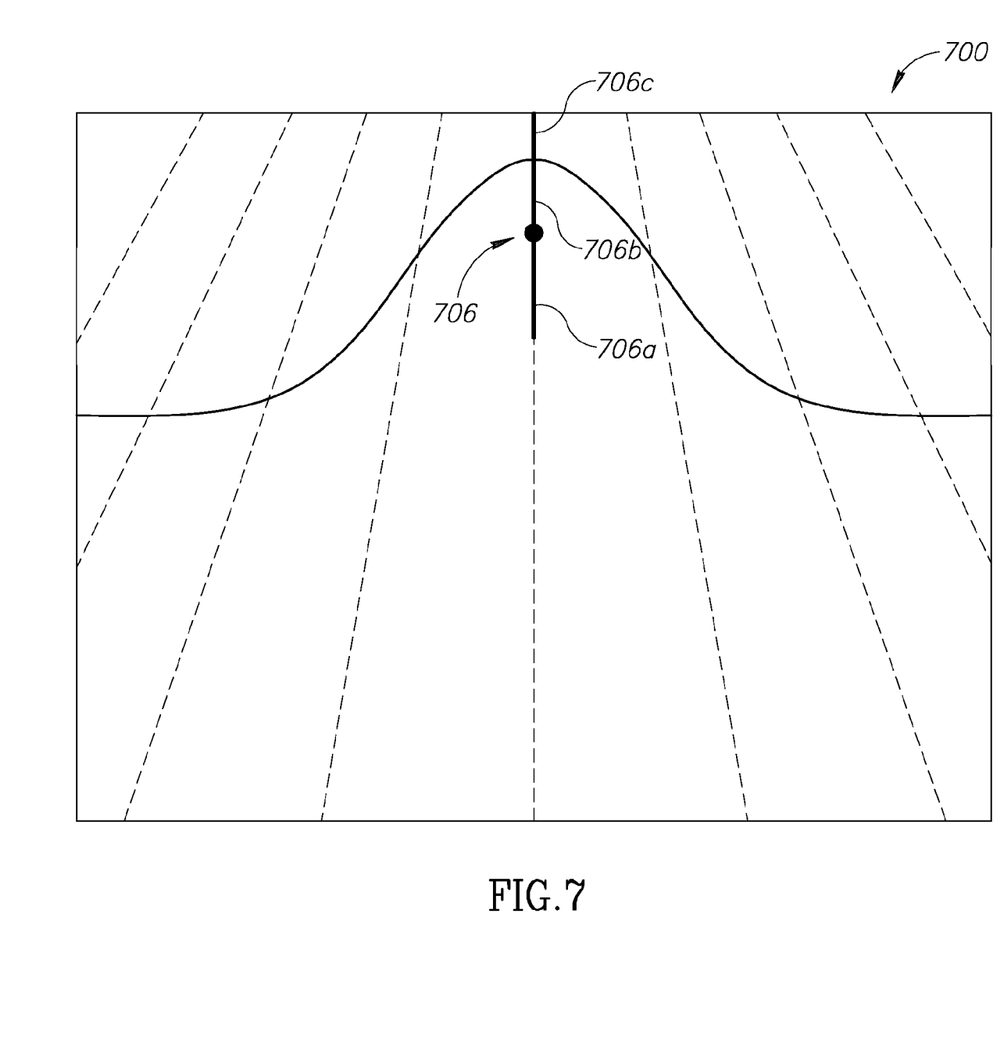
FIG. 7 shows a frame in which a geographic annotation is a discontinuous area.

In an optional step 208, DTM data is received, in order to enhance the overlaying of the geographic annotation. That is, certain terrain structures, which include elevated and/or depressed surfaces, may affect the position, size and/or shape of where the geographic annotation should be overlaid in order to reliably represent the amount of inaccuracy. Interim reference is made to FIG. 6, which shows an exemplary scenario in which DTM data may affect the position, size and/or shape of the overlaid geographic annotation. FIG. 6 depicts a UAV 600 which includes a camera 602 having a POV β. Reference is also made to FIG. 7, which shows a frame 700 as viewed from the angle of camera 602. In these exemplary FIGS. 6 and 7, a single object of interest 606 (FIG. 6) or 706 (FIG. 7) appears on a hillside. However, a portion of the terrain, namely—portion 614*c*, may be hidden from camera 602 since it is contained in a blind area 604*d* behind the hill.

If, for example, an error in the pitch parameter was indicated when frame 700 was captured, then the resulting geographic annotation may be a line, composed of portions 706*a*, 706*b* and 706*c*. Although these portions appear as a seemingly continuous line in FIG. 7, they are actually representative of a discontinuous area on the real terrain. This discontinuity may be detected with the aid of DTM data. The discontinuity may be easily seen in FIG. 6, where a portion 606*b* of the geographic annotation (corresponding to 706*b* in FIG. 7) is on the hillside, whereas a portion 606*c* (corresponding to 706*c* in FIG. 7) is at a certain distance behind that hill. This scenario dictates that, in order to overlay a geographic annotation which is truly representative of the inaccuracy pertaining to object 606, the terrain has to be taken into account.

Figure 3:
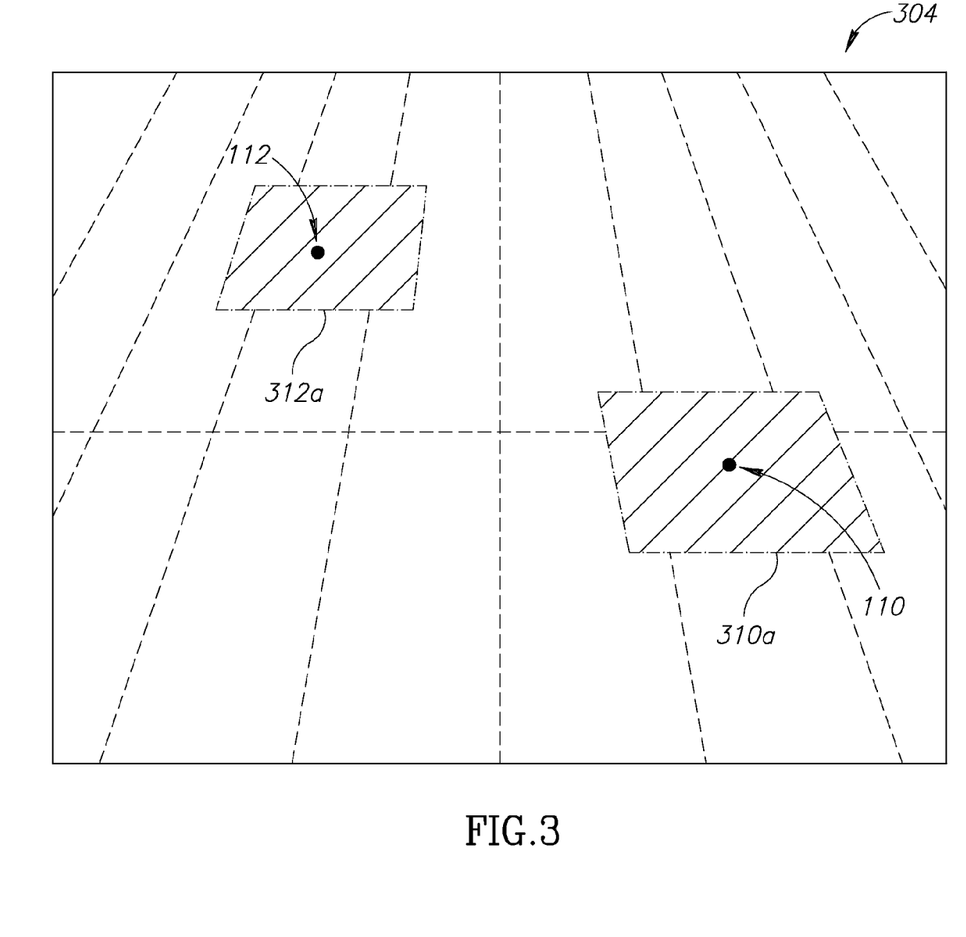
FIG. 3 shows an oblique aerial photograph captured during a period of inaccuracy in elevation and/or longitude/latitude parameters.
Figure 4:
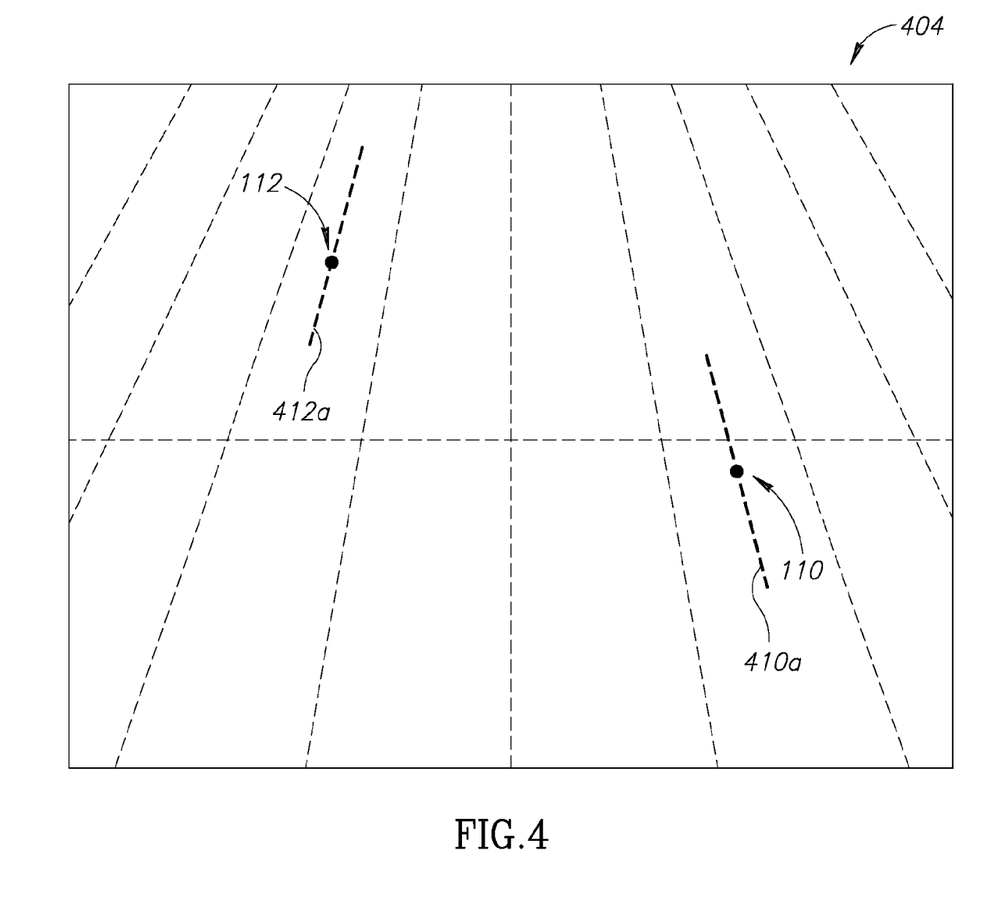
FIG. 4 shows an oblique aerial photograph captured during a period of inaccuracy in a pitch parameter.
Figure 5:
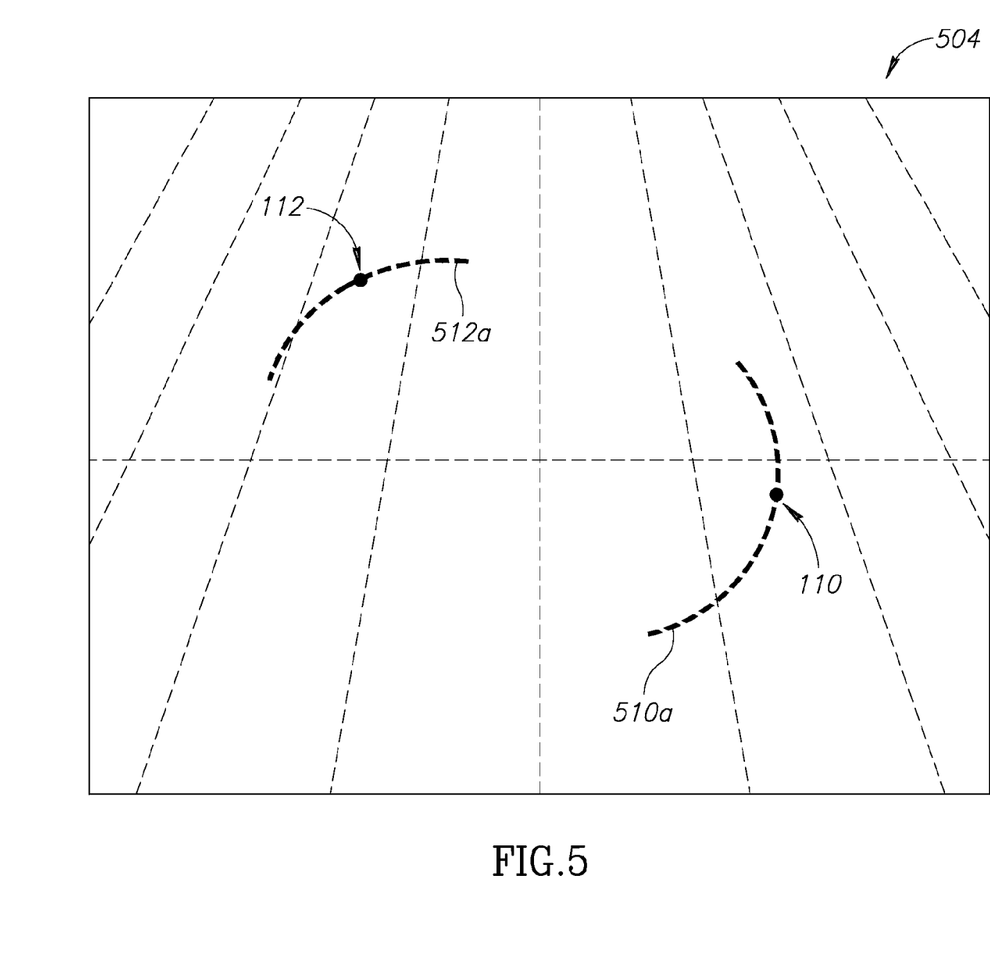
FIG. 5 shows an oblique aerial photograph captured during a period of inaccuracy in a yaw parameter.

Reference is now made back to FIG. 2A. In a step 210, a geographic annotation is overlaid on the video. The overlaying of the geographic annotation on the video may include, in a sub-step 212, a computation of a size and a shape which are representative of the amount of inaccuracy in the one or more parameters. Reference is now made to FIGS. 3, 4 and 5, which illustrate examples of computed sizes and shapes of geographic annotations, based on frame 104 of FIG. 1B.

FIG. 3 depicts an exemplary frame 304 including first object of interest 110 and second object of interest 112. When frame 304 was captured, the imaging equipment and/or the UAV suffered from inaccuracy in the longitude/latitude parameters. This inaccuracy implies that the size and the shape of objects 110-112 cannot be overlaid on frame 304 with certainty. Accordingly, in accordance with the present method, a size and a shape which are representative of the amount of inaccuracy are computed. In this example, if the imaging equipment and/or the UAV suffered from inaccuracy in the longitude/latitude parameters, geographic annotations 310a and 312a may cover areas which takes into account longitude/latitude deviation. Geographic annotations 310a and 312a may be square, when looked at from above, if the error in the longitude parameters is equal to the error in the latitude parameter. From an oblique view, annotations 310a and 312a may be parallelograms.

FIG. 4 depicts an exemplary frame 404, including first object of interest 110 and second object of interest 112. When frame 304 was captured, the imaging equipment and/or the UAV suffered from inaccuracy in the pitch parameter of the metadata. This inaccuracy implies that the size and the shape of objects 110-112 cannot be overlaid on frame 304 with certainty. Accordingly, in accordance with the present method, a size and a shape which are representative of the amount of inaccuracy are computed. In this example, the inaccuracy in the pitch parameter means that the position of the geographic annotations which represents objects 110-112 should be closer or farther away from the camera than these objects are in reality. Accordingly, a first geographic annotation 410a and a second geographic annotation 412a may be overlaid on the video, to represent the possible area over which objects 110-112 may extend in reality.

FIG. 5 depicts an exemplary frame 504, including first object of interest 110 and second object of interest 112. When frame 504 was captured, the imaging equipment and/or the UAV suffered from inaccuracy in the roll and/or yaw parameter of the metadata. Even though there is a difference between the implications of roll and yaw inaccuracies, these two types of inaccuracies are demonstrated using a single, schematic figure. The roll and/or yaw inaccuracy implies that the size and the shape of objects 110-112 cannot be overlaid on frame 304 with certainty. Accordingly, in accordance with the present method, a size and a shape which are representative of the amount of inaccuracy are computed. In this example, the inaccuracy in the roll and/or yaw parameters means that the position of the geographic annotations which represents objects 110-112 should be over an arc extending to the left and to the right of objects 110-112; the arc may have an upwards curvature in the higher half of frame 504, and a downwards curvature in the lower half of the frame. Accordingly, a first geographic annotation 410a and a second geographic annotation 412a may be overlaid on the video, to represent the possible area over which objects 110-112 may extend in reality.

The computation of the size and/or shape of the geographic annotation, performed in step 212 of FIG. 2A, may be performed, mutatis mutandis, using geometrical and optionally other techniques known in the art for geo-referencing of aerial photography.

Figure 2B:
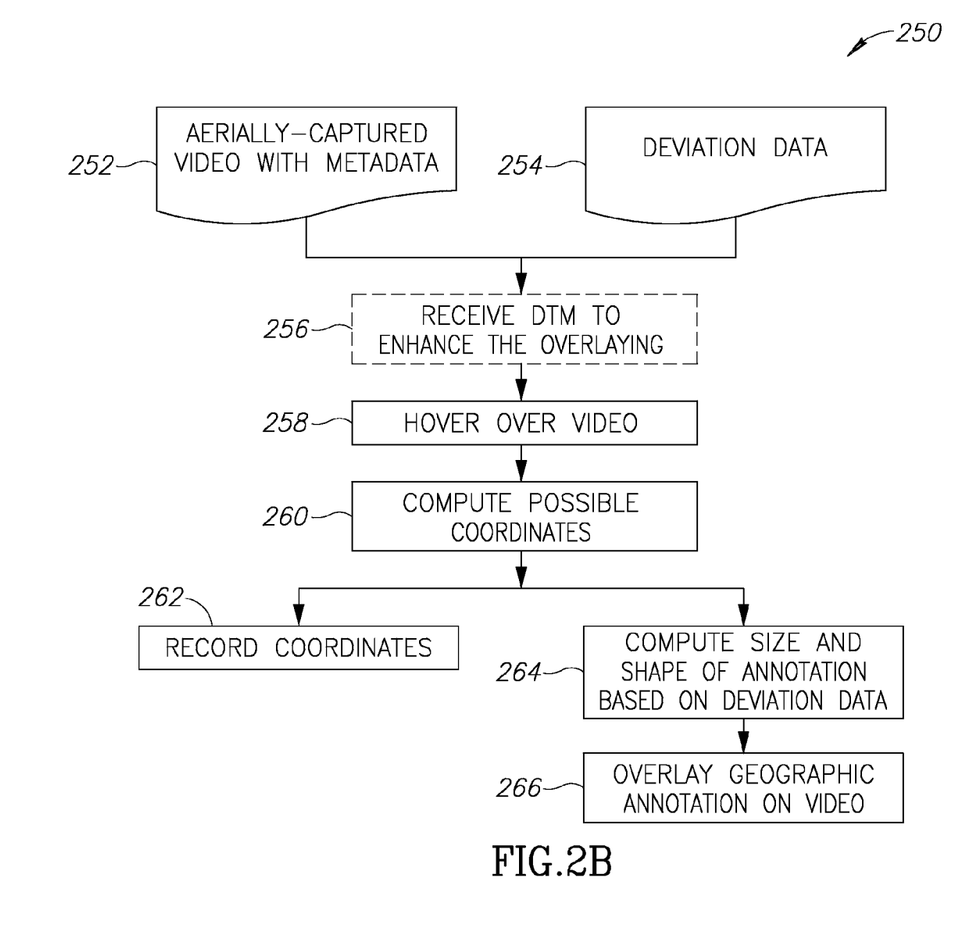
FIG. 2B shows a flowchart of another method for overlaying one or more geographic annotations on an aerially-captured video.

Reference is now made to FIG. 2B, which shows a flowchart of a method 250 for overlaying one or more geographic annotations on an aerially-captured video, in the "mark-to-annotation" mode. Method 250 may be executed, for example, by at least one hardware processor.

In a step 252, an aerially-captured video and metadata associated with the video are received, for example by a workstation operable to carry out method 250 or any portion thereof.

In a step 254, deviation data is received. The deviation data may be digital data, indicative of an amount of inaccuracy in the metadata, namely—in at least one parameter of the metadata. For example, the inaccuracy may be in one or more of the following metadata parameters: position (longitude, latitude, elevation), pitch, roll, yaw, camera field-of-view and/or the like. The deviation data may become available by a number of means. As one option, a user may manually enter deviation data. As another example, the deviation data may be based on data provided by a manufacturer of the pertinent equipment; for example, the accuracy of the GPS module may be reported by its manufacturer to be within ±10 meters. As a further example, the deviation data may be automatically created on board UAV 100 (FIG. 1), for instance by inaccuracies reported by the instrumentation on board on the UAV or otherwise deduced.

In an optional step 256, DTM data is received, in order to enhance the overlaying of the geographic annotation. Step 256 is optionally similar or identical to step 208 of FIG. 2A.

In a step 258, a user interface, for example a graphical user interface (GUI), is provided, for enabling the user to mark a position on the video (also to "hover over the video"). As the user hovers over the video with a pointing device of the workstation.

In a step 260, as the user hovers over the video, possible real geographic coordinates of each video pixel hovered over are computed of the fly, namely—in real time. When the user wishes to finally mark a certain position in the video, he or she may issue a command, such as by clicking the pointing device. In response to this command, method 250 may proceed in one or both of the following ways: In a step 262, the user interface may store the finally-marked location of the object of interest, for example in a digital file separate from the video and/or inside the video file—either as metadata or as a graphical shape (and optionally text) embedded in the video's frames. In a step 264, the computed coordinates may be used to compute a size and a shape of a geographic annotation at the finally-marked location, based on the deviation data. Then, in a step 266, the geographic annotation is overlaid on the video.

Figure 8:
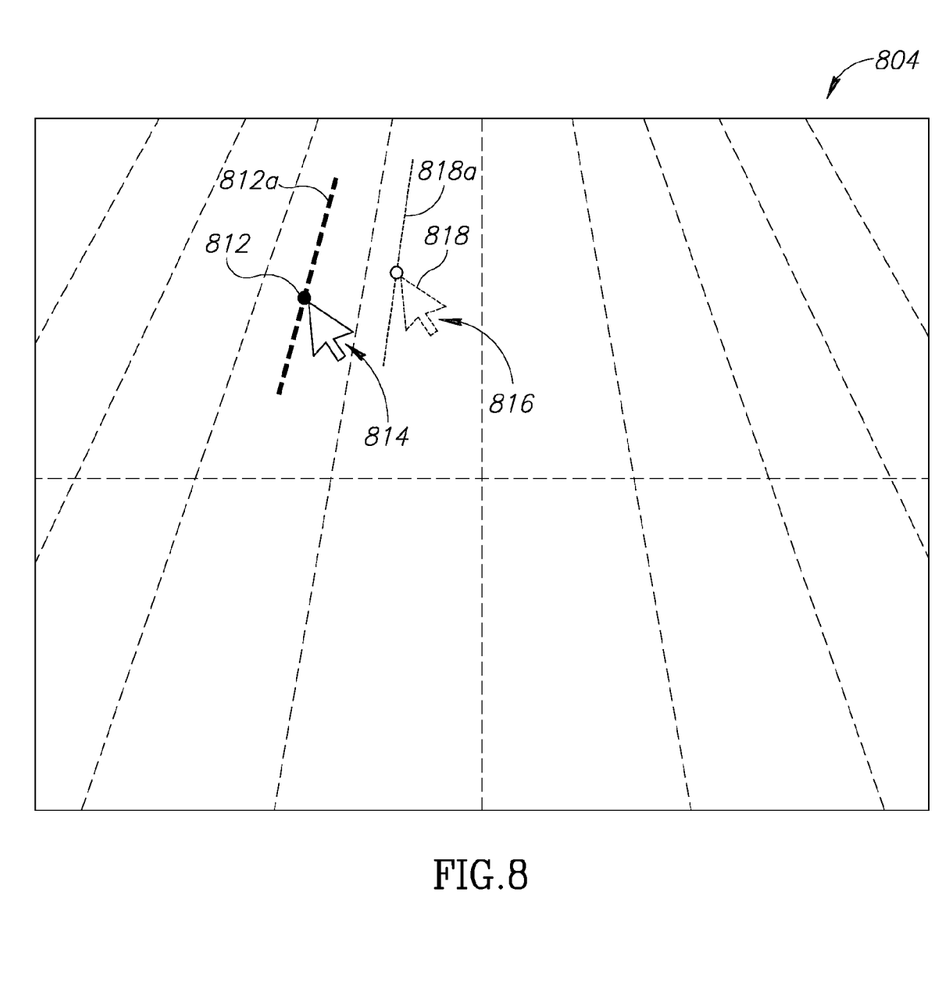
FIG. 8 shows a video frame being part of a user interface for marking a desired location of an object of interest.

Reference is now made to FIG. 8, which shows a video frame 804, being part of such a user interface. In this exemplary user interface, the user may utilize a cursor 814, operable by a pointing device (for example a mouse, an eye tracker, a touch screen and/or the like) for marking a desired location, in frame 804 of the video, for an object of interest. In this example, the user desires to mark the location of an object of interest 812. The user may therefore hover, with cursor 814, over frame 804. As the user hovers, the user interface may overlay on frame 804 a geographic annotation having a size and a shape representative of the amount of inaccuracy associated with that specific frame. By way of example, assume that when frame 804 was captured, the imaging equipment and/or the UAV suffered from a certain error in the pitch parameter of the metadata, and, accordingly, a deviation of up to ±5° in pitch is expected. Based on this deviation data, the user interface overlays on frame 804 an elongated line 812a, extending over an area which starts closer to the camera than object of interest 812 and ends farther away from the camera than the object of interest. That is, shape 812a is indicative of where object of interest 812 may be positioned in reality, based on the possible deviation at the time frame 804 was captured. Shape 812a is representative, therefore, of a range of geographic coordinates which is larger than the actual range of geographic coordinates over which the actual object of interest 812 extends.

When the user is satisfied with the position of object of interest 812, he or she may release cursor 814 or issue a suitable command, such as by clicking, thereby fixating the location of shape 812a. However, until the user releases cursor 814 or issues the other suitable command, the user interface may, in real time, move object of interest 812 and/or shape 812a over frame 804—in coordination with the changing position of cursor 814. For example, cursor 814 may move to a new position 816, thereby moving object of interest 812 to a corresponding new position 818, and shape 812a into a corresponding new position 818a.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising using at least one hardware processor for:
receiving a video of a terrain captured by an aerial-based camera and metadata associated with the video;
receiving deviation data indicative of an amount of inaccuracy in the metadata;
receiving a digital terrain model (DTM); and
computing, in real time and responsive to a user marking the location in the video, a geographic annotation representing a possible range of geographic coordinates of a location,
wherein the geographic annotation is computed as a function of the deviation data,
wherein the geographic annotation represents the amount of inaccuracy corresponding to a discontinuity in the terrain captured by the camera,
wherein the discontinuity is due to a structure of the terrain that caused a portion of the terrain to be hidden from the camera, and
wherein a size and shape of the geographic annotation is enhanced using the DTM.

2. The method according to claim 1, wherein the metadata comprises at least one parameter selected from the group consisting of: longitude, latitude, elevation, pitch, roll, yaw and field-of-view, and wherein the amount of inaccuracy pertains to at least one parameter of said group.

3. A computer program product for overlaying a geographic annotation on an aerially-captured video, the computer program product comprising a non-transitory computer-readable storage medium having program code embodied therewith, the program code executable by at least one hardware processor to:
receive a video of a terrain captured by an aerial-based camera and metadata associated with the video;
receive deviation data indicative of an amount of inaccuracy in the metadata;
receiving a digital terrain model (DTM); and
compute, in real time and responsive to a user marking the location in the video, a geographic annotation representing a possible range of geographic coordinates of a location,
wherein the geographic annotation is computed as a function of the deviation data,
wherein the geographic annotation represents the amount of inaccuracy corresponding to a discontinuity in the terrain captured by the camera,
wherein the discontinuity is due to a structure of the terrain that caused a portion of the terrain to be hidden from the camera, and
and wherein a size and shape of the geographic annotation is enhanced using the DTM.

4. The computer program product according to claim 3, wherein the program code is further executable by said hardware processor to provide a user interface configured to enable the user to mark the location on the video.

5. The computer program product according to claim 3, wherein the parameters are selected from the group consisting of: longitude, latitude, elevation, pitch, roll, yaw and field-of-view, and wherein the amount of inaccuracy pertains to at least one parameter of said group.

6. The computer program product according to claim 3, wherein the geographic annotation is a continuous area.

7. The method according to claim 1, further comprising overlaying, on the video, the geographic annotation descriptive of the marked location in the video, wherein the geographic annotation is of a size and a shape representative of the amount of inaccuracy.

8. The computer program product according to claim 3, further comprising overlaying, on the video, a geographic annotation descriptive of the marked location in the video, wherein the geographic annotation is of a size and a shape representative of the amount of inaccuracy.

* * * * *